Patented May 10, 1927.

1,628,370

UNITED STATES PATENT OFFICE.

ALFRED N. NELSEN, OF LONG BEACH, CALIFORNIA.

WATERPROOFING COMPOSITION AND METHOD OF MAKING THE SAME.

No Drawing. Application filed December 11, 1923. Serial No. 680,040.

The object of this invention is to provide a liquid composition with which to treat materials for water-proofing the same.

The materials may be flexible as leather, canvas, muslin and other fabrics. The composition is also adapted for water-proofing wood, roofing and building paper and it will also form a rust-proof coating for iron and will adhere to other metals and materials. It may be used for water-proofing brick walls, plastered walls and in fact may be used as a water-proofing for most situations in which water-proofing is desired.

My newly discovered water-proofing composition contains linseed oil, litharge and sulphur and may also contain graphite or plumbago.

The proportions of these materials are substantially as follows:

Linseed oil, 1 gallon; litharge, about 1 pound; sulphur, about 1½ pounds; graphite, about 1½ ounces.

The method of preparing my water-proofing composition is as follows:

To the raw linseed oil add the litharge and sulphur; thoroughly mix by stirring the product while all of the ingredients are cool. When the ingredients are thoroughly mixed I then put them in a vessel and place them over a fire and bring the batch to a temperature of something over 212° Fahrenheit.

When the mass has just come to a boil it should be immediately taken off the fire, or the fire should be immediately turned out to prevent the liquid from boiling over.

I have used an artificial substitute for the linseed oil with good success, and it is understood that I do not limit myself by the term linseed oil, as I propose to use any well known equivalent of linseed oil in place of the genuine raw linseed oil.

When the composition has become cooled sufficiently to handle, I strain the contents of the vessel through a fine screen or coarse cloth; the purpose being to remove the grains or coarser particles that may be found in the litharge and sulphur.

The composition thus produced can be applied cold to any of the materials above referred to, and in case of fabrics, the composition penetrates and will even penetrate to such an extent that a fabric painted on one side with the composition while the other side is supported by a surface, will be cemented to the surface supporting such fabric.

With either the single or double thickness of fabric thus painted, great flexibility is secured.

If desired, the fabric to be treated may be dipped in the composition and run between rolls as through an ordinary clothes ringer, thus pressing the substance into the fabric. After it has been allowed to dry, the fabric may be coated once or twice with the composition applied by a brush.

If the surface of the composition on the sheet coated by dipping and running through rolls is found to be rough, the surface may be smoothed by fine sandpaper or steel wool, and another coat applied.

When it is desired to increase the flexibility of the coating and a black color is not objectionable, I add to the cold composition of litharge, sulphur and linseed oil, a quantity of graphite in the proportions of about 1½ ounces graphite to one gallon of oil, one pound of litharge and 1½ pounds of sulphur.

The methods of applying the composition containing graphite is substantially the same as above stated for the composition without the graphite.

The composition without graphite may be colored to any desired color by the addition of appropriate coloring matter. For a bright yellow, add to the composition of litharge, oil and sulphur, a sufficient quantity of powdered yellow pigment to serve the purpose.

When the material is coated as desired, the coating is allowed to dry. The drying may be accelerated by adding japan, turpentine, or other well known drier in sufficient quantities to obtain the desired result.

I find that the addition of turpentine to the composition eliminates such sulphur smell as may be noticeable in case other driers are used.

I claim:

1. The water-proofing composition set forth containing linseed oil, litharge and sulphur in the proportions substantially of 1 gallon linseed oil, 1 pound of litharge, 1½ pounds of sulphur.

2. The water-proofing composition set forth comprising the following ingredients in the proportions substantially of 1 gallon linseed oil, 1 pound litharge, 1½ pounds sulphur and 1½ ounces graphite.

3. The method set forth of making a water-proofing composition which comprises, mixing 1 gallon linseed oil, 1 pound litharge, 1½ pounds of sulphur while the ingredients are cool, then heating the ingredients to about 212° Fahrenheit, then cooling the ingredients, and then straining them to remove the coarser particles.

In testimony whereof, I have hereunto set my hand at Los Angeles, California, this 20th day of November, 1923.

ALFRED N. NELSEN.